United States Patent [19]

Igashira et al.

[11] 4,368,380

[45] Jan. 11, 1983

[54] FLEXIBLE CERAMIC PTC ELECTRIC HEATER ASSEMBLY

[75] Inventors: Toshihiko Igashira, Toyokawa; Ken Nomura, Okazaki; Seiko Abe, Kariya, all of Japan

[73] Assignee: Nippon Soken, Inc., Nishio, Japan

[21] Appl. No.: 187,941

[22] Filed: Sep. 16, 1980

[30] Foreign Application Priority Data

Oct. 26, 1979 [JP] Japan ............................... 54-139005

[51] Int. Cl.³ .................... F02M 31/00; H05B 3/02; H01C 7/02
[52] U.S. Cl. .................................. 219/539; 123/548; 123/549; 123/590; 219/206; 219/207; 219/275; 219/505; 219/541; 219/549; 261/142; 338/22 R; 338/295; 338/328
[58] Field of Search ............... 219/206, 207, 504, 505, 219/541, 539, 275; 123/547, 548, 549, 557, 590; 338/22 R, 295, 328; 261/142

[56] References Cited

U.S. PATENT DOCUMENTS

| | | | |
|---|---|---|---|
| 3,898,422 | 8/1975 | Fuller et al. ................... | 338/328 X |
| 3,987,772 | 10/1976 | McBride ........................ | 219/206 X |
| 3,995,141 | 11/1976 | Vieau et al. .................... | 219/505 X |
| 4,104,509 | 8/1978 | Van Bokestal et al. ........ | 338/295 X |
| 4,121,088 | 10/1978 | Doremus et al. ............... | 219/505 X |
| 4,242,999 | 1/1981 | Hoser ............................. | 123/549 X |
| 4,246,880 | 1/1981 | Henke et al. ................... | 123/548 X |

Primary Examiner—A. Bartis
Attorney, Agent, or Firm—Cushman, Darby & Cushman

[57] ABSTRACT

A flexible barium titanate ceramic PTC heater for use in, for example, an intake pipe of an internal combustion engine to heat the air-fuel gas mixture is formed as a thin disc-shaped ceramic sheet constituted by a plurality of individual coplanar ceramic segments having interior edges positioned in spaced side-by-side relationship. The juxtaposed edges of the ceramic segments are united to each other by a flexible, heat-resistant, electrically non-conductive rubber band disposed in the space between the segments and bonded thereto by an electrically non-conductive adhesive to form the segments into a thin disc-shaped sheet which can be flexed without causing flexing of any of the individual segments. The ceramic heater is positioned in a metallic casing with one planar face thereof bonded to the inner surface of the casing by an electrically conductive adhesive. A stainless steel wool cushioning member engages the other planar face of the ceramic heater to support the heater in the metallic casing.

9 Claims, 5 Drawing Figures

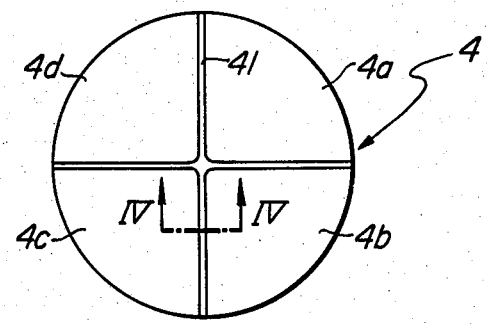
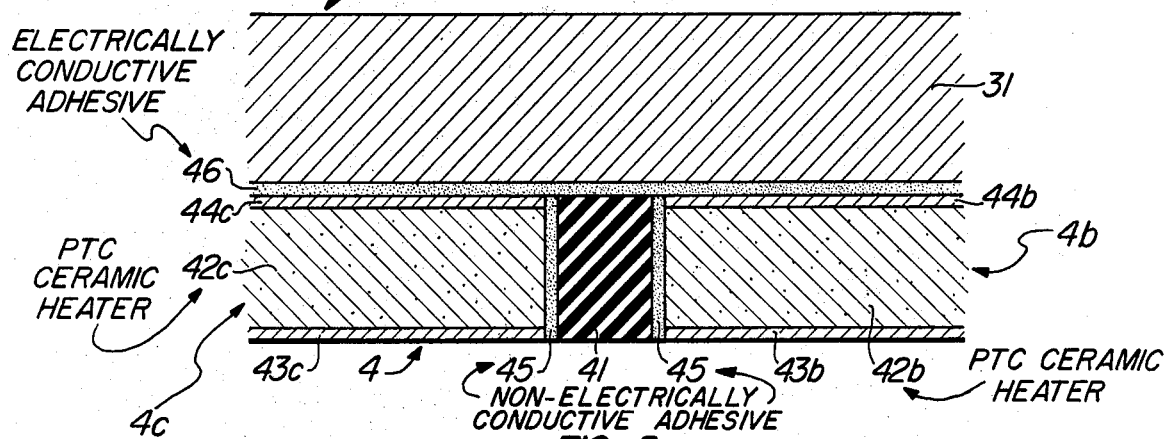
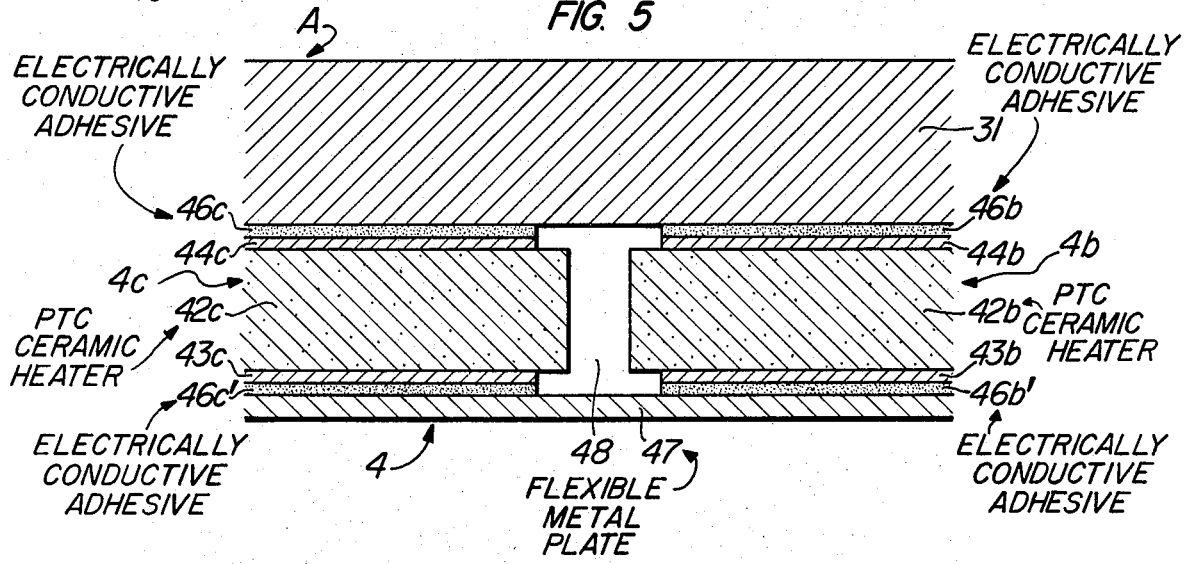

FLEXIBLE CERAMIC PTC ELECTRIC HEATER ASSEMBLY

BACKGROUND OF THE INVENTION

The present invention relates to a ceramic heater for use in an intake pipe heater of internal combustion engines or the like purposes and, more particularly, to a novel construction of a flexible ceramic heater which is adaptable to external force and less liable to be broken.

Recently, there is a tendency that ceramic heaters having positive temperature coefficient (PTC) characteristics are used for mixed air-fuel gas heating devices of internal combustion engines.

The ceramic heater is formed mainly of barium titanate by baking, and exhibits a low electric resistance at normal temperature but the electric resistance is drastically increased at a so-called Curie point which usually falls between 120° and 150° C. In general, this ceramic heater is shaped to have a form of a thin disc and is pressed at its one side with a metallic plate as a heating medium or adhered to the same by means of a conductive adhesive during the use. Usually, the metallic plate constitutes a part of the casing of the ceramic heater. In the ceramic heater of the type described above, the casing is often distorted by a pressure exerted on the outside of the casing. The ceramic heater itself, however, is very fragile and can be distorted only slightly. In consequence, the ceramic heater is broken by such an external force or, even if it is not broken, a small gap is undesirably formed between the ceramic heater and the casing to deteriorate the heat transfer characteristics.

This problem would be overcome if the ceramic heater itself has a certain flexibility. This, however, is extremely difficult to realize.

SUMMARY OF THE INVENTION

It is, therefore, a major object of the invention to overcome the above-described problems of the prior art by providing an improved ceramic heater.

To this end, according to the invention, there is provided a ceramic heater in which the disc-shaped or polygonal ceramic body is divided into a plurality of segments. These segments are connected to one another through a flexible and soft medium or, alternatively, arrayed and bonded to a common thin metallic plate, so that the PTC ceramics as a whole exhibit a flexibility at least partially.

This arrangement eliminates the breakage of the ceramics and keeps the close contact of the casing as the heating medium and the ceramic heater to ensure a good transfer of heat therebetween.

The above and other objects, as well as advantageous features of the invention will become clear from the following description of the preferred embodiments taken in conjunction with the accompanying drawings.

BRIEF DESCRIPTION OF THE DRAWINGS

FIG. 3 is a plan view of only a ceramic heater of the mixed air-fuel gas heating device shown in FIG. 1;

FIG. 4 is an enlarged sectional view of the ceramic heater taken along the line IV—IV in FIG. 3; and FIG. 5 is an enlarged sectional view of a main part of the ceramic heater according to another embodiment of the invention.

DESCRIPTION OF THE PREFERRED EMBODIMENTS

Figure 1:
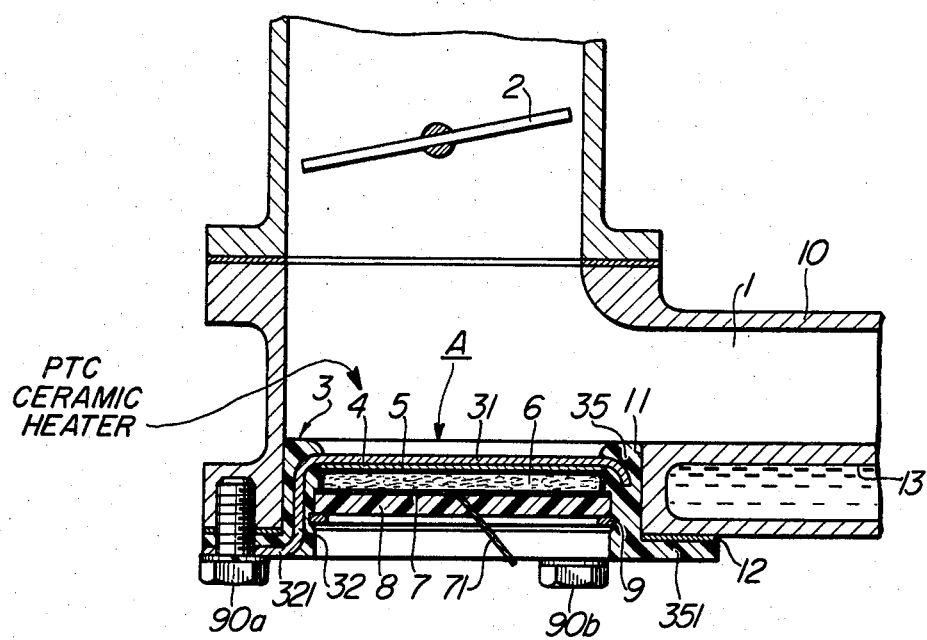
FIG. 1 is a sectional view of a ceramic heater of the invention attached, as a mixed air-fuel gas heating device, to an intake pipe of an internal combustion engine.
Figure 2:
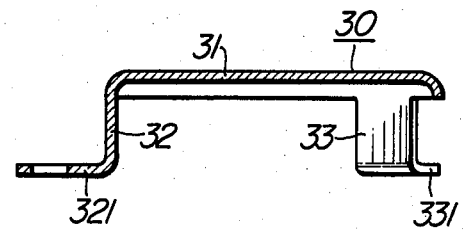
FIG. 2 is a sectional view of only a base portion of the casing of the mixed air-fuel gas heating device shown in FIG. 1.

Referring to FIGS. 1 and 2, a reference numeral 1 denotes an intake passage of an internal combustion engine at the upstream side portion of which disposed is a carburetor not shown. The fuel supplied through a fuel supplying opening to the venturi of the carburetor is mixed with the intake air and the mixture is supplied to the combustion chambers (not shown) of the engine through the intake passage 1 via a throttle valve 2. A circular bore 11 is formed at a so-called heat-riser portion immediately below the throttle valve 2, and a mixed air-fuel gas heating device generally represented by a symbol A is disposed at that portion.

The mixed air-fuel gas heating device A has a casing 3 which is constituted by a disc-shaped heating portion 31 formed integrally from a thin aluminum plate, a base portion 30 having three legs two of which are shown at 32, 33, extending from the periphery of the heating portion 31 and a heat insulating cover member 35 which covers the legs. In FIG. 1, two of the three legs are not shown because they are out of the section of FIG. 1. The heat insulating cover member 35 is made of a plastic or ceramic material and has a tubular form and constitutes together with the legs embedded therein a support for supporting the casing 3 within the opening 11.

As will be seen from FIG. 2 showing a section of the base portion 30, flanges 321, 331, etc. are formed at the ends of the legs 32, 33, etc. The bottom surfaces of these flanges are exposed from the bottom surface of a flange 351 formed at the edge of the heat insulating cover member 35, and both bottom surfaces are flush with each other.

A ceramic heater 4 according to the invention is bonded to the back side of the heating portion 31 by means of a conductive adhesive. In the illustrated embodiment, the upper and lower sides are positive and negative terminals, respectively.

A saucer-shaped electrode 5 made of a thin aluminum plate is pressed at its bottom side to the lower side of the heat generating member. Further, a stainless steel wool 6 is pressed to the lower side of the electrode 5. This stainless steel wool 6 is a cushioning member constituted by a braid of stainless steel wires each of which having a diameter of 0.1 mm or so. The stainless steel wool 6 is contacted at its lower side with a copper plate 7 which has a form of thin disc. The disc-shaped copper plate 7 is cut at its central portion and the cut piece is projected downwardly in the form of a claw 71. This claw 71 is electrically connected to the positive terminal of a series of batteries (not shown).

The copper plate 7 is supported at its lower face by a stay 8 made of an electrically insulating resinous material and having a comparatively large thickness. The stay 8 is pressed upward and supported by a circular clip 9 fitting in a groove formed in the inner peripheral surface of the cover member 35. The aforementioned claw 71 of the copper plate 7 extends through the central portion of the stay 8.

The heating portion 31 in the casing 3 of the mixed air-fuel gas heating device A constitutes a part of the wall of the intake pipe 10, and the cover member 35 having legs 32, 33, etc. embedded therein fits the opening 11 of the intake pipe. The cover member 35 is fixed to the intake pipe 10 by means of bolts 90a, 90b which penetrate the portions of the flange 351 in which the flanges 321, 331, etc. are embedded, so that the flanges 321, 331, etc. of the legs are electrically connected to the intake pipe 10 through the bolts 90a, 90b, etc. Between the flange 351 of the cover member 35 and the intake pipe 10, a gasket 12 is interposed. Also, the intake pipe 10 is provided with a water jacket 13 in which cooling water for cooling the engine is circulated.

Upon starting the cold engine, the temperature of the intake pipe 10 including its water jacket 13 is as low as the ambient air temperature. As the key switch is closed for starting the engine, the ceramic heater 4 is energized by the power supplied from the batteries. More specifically, the D.C. electric current flows from the positive electrode of the batteries to the negative electrode of the same via the claw 71 of the copper plate 7, stainless steel wool 6, saucer-shaped electrode 5, ceramic heater 4, heating portion 31 of the casing, legs 32, 33, etc. of the casing, bolts 90a, 90b, etc. and the intake pipe 10. In this closed electric circuit, only the ceramic heater 4 exhibits a substantial electric resistance. Thus, the ceramic heater 4 generates heat while consuming the electric power. Since the PTC ceramic heater exhibits a small resistance at the normal temperature, it is heated instantaneously up to the Curie point which falls between 120° and 150° C. and the generated heat is transferred to the heating portion 31.

The heat delivered to the heating portion 31 is transferred to three legs 321, 331, etc. but the heat transfer therefrom to the intake pipe 10 is made only through three bolts 90a, 90b, etc. because the intake pipe 10 and the legs are thermally insulated by the cover member 35. Thus, only small amount of heat is allowed to be transferred to the intake pipe 10. Also, the heat loss due to the radiation of heat from the legs 321, 331, etc. is suppressed because the legs are covered by the cover member 35. The legs embedded in the cover member 35 serve also as reinforcement core member of the latter to ensure a sufficiently high mechanical strength of the cover member 35.

It is possible to use a tubular leg instead of the illustrated plurality of legs. This, however, is not so recommendable because the heat transfer to the intake pipe is suppressed by limiting the area of path of the heat transfer when a plurality of comparatively thin legs are used as in the illustrated embodiment.

In consequence, the heating portion 31 shares almost the whole part of the heat generated by the ceramic heater 4 to efficiently promote the evaporation of the fuel. After operating the engine for several minutes subsequent to the start-up of the engine, the cooling water in the water jacket is heated up to a temperature of 80° C. or higher. Then, the power supply to the ceramic heater 4 may be stopped.

The detail of the ceramic heater 4 heretofore described will be explained with specific reference to FIGS. 3 and 4. FIG. 3 is a plan view of the ceramic heater 4. Although the ceramic heater 4 seems to have an integral disc-like form, it is actually divided into four segments by cross-like lines of division. In other words, the ceramic heater 4 is formed as an assembly of four sector segments 4a, 4b, 4c and 4d. These segments are jointed to one another not directly but through the medium of a cross-shaped band 41 (soft member) of a heat-resisting rubber such as fluororubber. The section of the jointing portion taken along the line IV—IV is shown in a larger scale in FIG. 4. Only the ceramic portion of the segment 4c is designated by a numeral 42c, while only the ceramic portion of the segment 4b is denoted by a numeral 42b. The ceramic pieces 42b, 42c are formed by baking mainly from barium titanate. The Curie point is adjusted by adding small amounts of lead (Pb), manganese (Mn) and so forth to fall within the range of between 120° to 150° C. As explained before, the electric resistance of these ceramics are drastically changed across this Curie point. More specifically, the ceramics exhibit a small electric resistance at normal temperature, but the electric resistance is increased to an extremely high level as the Curie point is exceeded. Nickel plating layers 43b, 44b are formed on both sides of the ceramic piece 42b, to serve as electrodes. The same applies also to other three segments. The electrode 43b contacting the stainless steel wool 6 constitutes the positive electrode, while the electrode 44b contacting the casing surface adjacent to the heating portion 31 constitutes the negative or grounding electrode.

The adjacent ceramic pieces, e.g. the ceramic pieces 42b, 42c, are bonded to each other through the band 41 of heat-resisting rubber. The band 41 has a rectangular cross-section and can withstand a temperature in excess of 150° C., and is shaped from a highly elastic material such as silicone rubber, fluororubber or the like. The band 41 is bonded to both ceramic pieces 42b, 42c, by means of an electrically non-conductive adhesive 45 such as silicon or epoxy resin adhesive.

The described ceramic heater constituted by the members 41 to 45 is adhered at its grounding-electrode side to the heating portion 31 of the casing by means of an electrically conductive adhesive 46. The adhesive 46 is of epoxy or silicon resin containing powders of silver (Ag) at a high density, and exhibits a high heat conductivity, as well as high electric conductivity.

During the operation of the internal combustion engine, the throttle valve 2 is maintained at a small opening except the case of the full load operation. In such a state, a highly reduced pressure (intake vacuum) which reaches 300 to 500 mmHg is established in the intake pipe 10. In consequence, the heating portion 31 of the casing 3 of the mixed air-fuel gas heating device A is sucked and lifted at its central portion to form a convex curved surface of a height of 30 to 100 microns, assuming that the heating portion 31 is made of an aluminum disc of 50 mm dia. and 1.2 mm thick. The ceramic heater 4, however, keeps the close contact with the heating portion 31, while absorbing the whole deflection by the rubber band 41.

FIG. 5 is an enlarged sectional view of another embodiment of the invention, showing the part corresponding to that of the first embodiment shown in FIG. 4.

As in the first embodiment, the ceramic heater of this embodiment is constituted mainly by four sector ceramic pieces 42a, 42b, 42c, 42d, although the sectional view in FIG. 5 shows only two 42b, 42c of these ceramic pieces. Nickel-plating layers 43b, 44b, 43c, 44c serving as electrodes are formed in both sides of the ceramic pieces 42b, 42c. The embodiment shown in FIG. 5 differs from the first embodiment in that the nickel-plating layers are not formed on the entire surfaces of the ceramic pieces 42b, 42c, but leave the peripheral portions of the ceramic pieces unplated. This applies also to the electrically conductive adhesives 46b and 46c for adhering the ceramic pieces to the heating portion 31.

The four ceramic pieces 42a, 42b, 42c and 42d are arrayed on and bonded to a plate 47 to form as a whole a disc. The adhesion is made by means of electrically conductive adhesive layers 46b', 46c'. As in the case of the nickel-plating layers, the adhesive layers 46b, 46c, 46b', 46c' are formed to leave the peripheries of the ceramic pieces 42b, 42c unplated. The plate 47 is made of a thin aluminum plate having a thickness of about 0.1 mm and carries four sector ceramic pieces thereon. The ceramic pieces are arrayed with a suitable gap between adjacent ones to form a cavity 48 as illustrated. This cavity 48 effectively absorbs the mechanical distortion of the heating portion 31. The cavity 48 may be filled with an electrically insulating and soft material. Also, it is possible to arrange such that the saucer-shaped electrode 5 serves also as the plate 47.

The embodiment shown in FIG. 5 offers the same advantage as the first embodiment: namely the absorption of the mechanical distortion of heating portion 31 and preservation of close contact between the ceramic pieces and the heating portion 31.

Although the invention has been described through its preferred forms, the described embodiments are not exclusive and various changes and modifications may be imparted thereto without departing from the scope of the invention.

For instance, although the ceramics are divided into four segments in the described embodiments, it is possible to divide the ceramics into 3 segments or even into 5 or 6 segments. The division need not always be made by diametrical or radial lines of division but be made by longitudinal and transverse lines of division.

In the embodiment shown in FIGS. 1 to 4, ceramic pieces may be bonded to one another by pouring a molten resin into the gap between adjacent ceramic pieces, instead of using the rubber band.

Furthermore, the ceramic heater and the heating portion of the casing may be simply pressed to each other although they are bonded to each other by an electrically conductive adhesive in the described embodiments.

As has been described, according to the invention, it is possible to obtain a flexible ceramic heater which is easy to assemble and to hold, by dividing the ceramics into a plurality of segments and jointing these segments to one another through the medium of flexible resin layers or by means of a thin metal plate on which the segments are arrayed and adhered, as if the segments are unitary with one another.

The flexible nature of the ceramic heater in turn offers advantages of durability of the ceramic heater against the external force and preservation of close contact between the ceramic heater and the heat transfer medium.

Further, by pressing and holding the thin ceramic plate by a cushioning member constituted by a braid of thin metal wires, all of the ceramic pieces are closely contacted to sufficiently perform their function.

What is claimed is:

1. A flexible ceramic heater comprising a thin, planar disc-shaped electrically resistive ceramic member having at least upper and lower sides each of which is provided with an electrode layer through which electric current is supplied to said ceramic member to generate heat therein wherein said ceramic member is comprised of a plurality of individual, coplanar segments each of which is provided with two interior edges and one exterior edge, wherein each of said two interior edges of each segment lie adjacent an interior edge of another adjacent segment, at least predetermined portions of each of said two interior edges of each segment being connected together through means defining a flexible, electrically non-conductive medium to form said segments into a thin disc-shaped ceramic sheet which can be flexed without causing flexing of any of the individual segments.

2. A ceramic heater as claimed in claim 1, wherein said flexible medium is comprised of a heat-resisting rubber, bonded to the interior legs of said segments through an electrically non-conductive adhesive.

3. A ceramic heater as claimed in claim 1, wherein said ceramic body is circular in shape and is divided into equal sector segments.

4. A ceramic heater as claimed in claim 1, wherein said ceramic body is formed by mainly from barium titanate.

5. A heating device comprising means defining an exterior metallic casing; a generally thin, planar, disc-shaped ceramic resistance heater mounted within said casing means, said ceramic heater having exterior planar faces, a plurality of electrodes secured on each of said exterior planar faces, said ceramic heater generating heat by being supplied with electric current in the direction of its thickness through said electrodes, said ceramic heater being positioned so as to have one planar face in electrical contact with an inner surface of said casing means, wherein said ceramic heater includes a plurality of ceramic segments, each of said segments having interior faces positioned side by side in a coplanar relationship to form a disc-like sheet, said segments being spaced apart to define spaces between the juxtaposed interior faces, and a flexible, electrically non-conductive connecting member secured to said interior faces within said spaces thereby connecting said ceramic segments together.

6. A heating device as claimed in claim 5 characterized in that said connecting member is a heat-resistant rubbery band having a rectangular shaped cross-section, said band being bonded to said segments so that two opposed faces of said connecting member are bonded with a non-conducting adhesive to said interior faces of said ceramic segments, with the other two opposing faces of said connecting member being positioned not higher than the exterior planar faces of said ceramic heater.

7. A heating device as claimed in claim 5 characterized in that the planar face of said ceramic heater opposite the planar face contacting the inner surface of said casing means is engaged by a cushion of metal wires, said device further including means for pressing said cushion of metal wires against said ceramic heater.

8. A heating device as in claim 5 wherein each of said plurality of ceramic segments have the same shape.

9. A flexible disc comprising thin metallic layer; a generally thin, planar, disc-shaped ceramic resistance heater mounted on said layer, said ceramic heater having exterior planar faces, a plurality of electrodes secured on each of said exterior planar faces, said ceramic heater generating heat by being supplied with electric current in the direction of its thickness through said electrodes, said ceramic heater being secured to said layer by an electrically conductive adhesive, wherein said ceramic heater includes a plurality of ceramic segments, each of said segments having interior faces positioned side by side in a coplanar relationship to form a disc-like sheet, said segments being spaced apart to define spaces between the juxtaposed interior faces, and a flexible, electrically non-conductive connecting member secured to said interior faces within said spaces thereby connecting said ceramic segments together.

* * * * *